United States Patent [19]
Brown

[11] Patent Number: 5,896,827
[45] Date of Patent: Apr. 27, 1999

[54] MILKING SYSTEM HAVING A SUBSTANTIALLY STABLE CONTINUOUS VACUUM LEVEL

[76] Inventor: Stanley A. Brown, 392 W. Magnolia Ave., Hanford, Calif. 93230

[21] Appl. No.: 08/829,866

[22] Filed: Apr. 1, 1997

Related U.S. Application Data

[60] Provisional application No. 60/024,909, Aug. 30, 1996.

[51] Int. Cl.$^6$ ........................................................ A01J 5/04
[52] U.S. Cl. .................................... 119/14.02; 119/14.37; 119/14.54
[58] Field of Search ............................. 119/14.02, 14.15, 119/14.37, 14.54

[56] References Cited

U.S. PATENT DOCUMENTS

| | | | |
|---|---|---|---|
| 2,628,589 | 2/1953 | Reeve ................................ | 119/14.37 X |
| 3,115,116 | 12/1963 | Schilling et al. ................ | 119/14.15 X |
| 3,187,719 | 6/1965 | Jones ................................. | 119/14.46 X |
| 3,512,504 | 5/1970 | Marley ................................. | 119/14.54 |

FOREIGN PATENT DOCUMENTS

| | | | |
|---|---|---|---|
| 2153046 | 7/1972 | Germany ........................... | 119/14.54 |

Primary Examiner—Robert P. Swiatek
Attorney, Agent, or Firm—Daniel J. Meaney, Jr.

[57] ABSTRACT

A milking system having a substantially stable continuous vacuum level through a milk claw and milk hose. The milking system includes a milking apparatus for connection with an animal's teats to apply a controlled vacuum thereto to remove milk therefrom at various milk flow rates. A milk claw is operatively connected to the milking apparatus to receive and pass the milk. The milk claw includes an outlet having side walls and a predetermined cross-sectional area selected to be in the range of a minimum cross-sectional area for maintaining, at a all milk flow rates, a substantially uniform laminar flow of milk therethrough and for concurrently providing a stable continuous vacuum in a vacuum channel between the laminar flow of milk and the interior side walls of the outlet and a maximum cross-sectional area equal to about 1.5 times the minimum cross-sectional area. A milk transportation conduit includes a milk hose formed of a semi-flexible material and any intermediate control devices operatively coupled between the inlet and outlet of the milk claw to transport the milk from the milk claw to a milk line. All intermediate control devices have a predetermined cross-sectional area substantially equal to the predetermined cross-sectional of the outlet of the milk claw.

17 Claims, 7 Drawing Sheets

Fig 18

MILKING SYSTEM HAVING A SUBSTANTIALLY STABLE CONTINUOUS VACUUM LEVEL

RELATED APPLICATION

This Application claims the benefit, under Title 35, United States Code §119(e), of United States Provisional Patent Application Ser. No.: 60/024,909 filed Aug. 30, 1996.

BACKGROUND OF THE INVENTION

1. Field of the Invention

This invention relates to a milking system having a milking apparatus for connection with a cow's teats to apply a controlled vacuum to the end of the teats to remove milk therefrom in combination with a novel and unique milk claw and more particularly relates to a milking system having a milking claw with an outlet and a milk transportation conduit wherein the predetermined cross-sectional area of each of the milk claw outlet and the milk transportation conduit components including the milk line is selected to be within a minimum and maximum range for maintaining, at all flow rates, a substantially uniform laminar flow of milk therethrough and for concurrently providing a stable continuous vacuum in a vacuum channel between the laminar flow of milk and the interior side walls of the milk claw outlet and milk transportation conduit.

2. Description of the Prior Art

Milking systems having a vacuum for performing milking of cows are well known in the art. Examples of such milking systems and controls therefor are described in several United States Patents.

U.S. Pat. No. 4,947,793 discloses a method and apparatus for measuring milk yield from an animal which has been milked using milking machinery. The milking machinery disclosed in U.S. Pat. No. 4,947,793 includes a valve which is operative to extract milk with minimum entrained air from the milking claw at a substantially constant pressure differential across the seat of the valve. The milking apparatus includes a detection and timing mechanism in which in use the apparatus detects the periods during which the valve is open and records the total time during a milking of an animal. The apparatus further includes a mechanism which translates the total time the valve is open into a measurement which indicates the yield of milk from the animal.

U.S. Pat. No. 4,616,215 discloses a vacuum monitoring apparatus which includes a control circuit having a transducer for sensing the vacuum levels in a milking system and for generating output signals. The control circuit includes a comparator for controlling indicator devices and an alarm circuit in response to a set point when the vacuum levels are at high, low and normal settings. The control circuit includes a time delay circuit that disables the alarm circuit for a predetermined time delay to provide for measurement of the vacuum recovery rate for the system.

U.S. Pat. No. 4,605,040 discloses a partial-vacuum regulating valve that automatically regulates an operating partial vacuum in milking systems. The partial-vacuum regulating valve consists of a main valve and an auxiliary valve. The auxiliary valve body is adjusted in accordance with the partial vacuum prevailing in the milking system and affects the amount of air that is drawn out of the main valve control chamber, which communicates with the atmosphere through a calibrated bore, through a certain channel. The partial-vacuum is adjusted in the control chamber in accordance with the amount of air drawn out and that adjustment determines the position of the auxiliary valve. The position of the auxiliary valve determines the amount of air flowing into a certain line through the air-inlet opening, which in, turn, affects the partial pressure in the line. The main-line control chamber has an additional calibrated air inlet that is closed off with a cap. When the cap is removed, atmospheric air also flows through the additional inlet into the main valve control chamber and reduces the partial vacuum therein. The associated descent of the valve body reduces the air admitted onto the line and hence leads to partial pressure in the milking system that is lower than the partial pressure established for the milking process by means of a screw and spring.

U.S. Pat. No. 4,572,104 discloses a method of milking for a double action milking system. Milking is initiated at one ratio of milk period and then increased to a selected higher ratio. Milking is then done at the selected higher ratio for a selected segment of time or until the milk flow rate falls below a predetermined value, after which the ratio is decreased so that milking is completed at a lower ratio. A valve is used to selectively alternatively connect a line going to the teat cups to vacuum or to atmospheric pressure.

U.S. Pat. No. 4,516,530 discloses an automated milking system in which the milking vacuum applied from a vacuum line through a milk flow valve and the milk hose to a teat cup cluster is initially shut off after automatic detacher controls provide a signal indicating the end of milking. A milk sweep controls a backflush system which passes a flushing fluid through the milk flow valve into the milk house and teat cup cluster to flush out these components.

U.S. Pat. No. 3,783,837 discloses a milking machine having a duct under partial vacuum that leads milk from the teat cup cluster to form a milk flow having a milking flow rate. The duct has a regulating valve which is used to vary the milking vacuum. A device for sensing changes in the rate of milk flow through the duct is connected to control means for operating the regulating valve to an idling value in response to a decrease in the milk flow rate and an increase in the milking vacuum from an idling value to a working value in response to an increase in the rate of milk flow.

U.S. Pat. No. 3,476,085 discloses an air vent plug adapted to be inserted in the wall of a milking inflation forming part of a teat cup cluster for improving the milk flow therethrough. The air vent plug includes a properly calibrated port in the plug for admitting a metered amount of air into the upper end of a milk tube portion of the teat inflation to push milk rapidly therefrom and prevents excessive pressure from being exerted on the teat orifice.

A reference entitled MACHINE MILKING AND LACTATION by A. J. Bramley, F. H. Dood, G. A. Mein and J. A. Bramley, published by Insight books, Vermon, USA, describes the history, background and state of the art in milking systems and in Chapter 7 entitled Basic Mechanics and Testing of Milking Systems by G. A. Mein appearing at Pages 235 through 284, discloses and describes typical milking machine installations (the "Bramley et al. Reference"). The Bramley et al. Reference recognizes that controlling the maximum vacuum drop in the system is desirable because the vacuum drop depends on surface finish of pipes and the overall effective length, including bends and fittings of piping in the milking system.

It is known in the art that mastitis can occur if a milk blockage occurs within the inflation of a teat cup cluster causing a back flow of milk into the teat's orifice. Mastitis is an infection of animal body tissue within the mammary system of an animal. Mastitis may be caused by a number of other conditions including irritation to the teats, as is well known to persons skilled in the art. In a milking process, mastitis is generally caused by an introduction of foreign bacteria into the animal's udder, e.g. cow's udder, caused by severe irritation to the teats such that the teat orifices cannot be protected from environmental bacteria entering the teats. When mastitis occurs, it is an infection that the animal, e.g. cow's, body must counteract. Thus the animal's body energy is to be used to fight infection rather than produce milk.

If the infection is severe enough, significant and sometimes permanent damage can be caused to the cow's normal milk producing organisms. All mastitis cause some level of permanent and lifetime irreputable damage to the animal's milk producing (mammary) system. The level of severity is in direct relation to the severity and length of time that an infection exists. As such, a severe or lengthy period of infection may limit the animal's production capabilities and affect the animals milk producing life.

A milking machine or milking system generally cause mastitis in two ways.

First, mastitis is caused by application of damaging vacuum levels to the cows' teats which create a severe irritation. Since it is difficult to isolate with any degree of certainty at what level of vacuum such irritation occurs, the conservative approach is the least level of vacuum, the better. Each animal, such as a cow, reacts differently to vacuums being applied to teats and each animal tolerates various levels of vacuum differently.

Second, mastitis is created by a milking apparatus, causing foreign bacteria to be introduced into the animal, e.g. cow. As milk is being drawn from the cow, the teats are exposed to a vacuum which is less than atmospheric pressure. However, the outside of the udder is under atmospheric pressure and, in essence, atmospheric pressure is what is "squeezing" the milk out of the animal's teats in response to a periodic pulsating or controlled vacuum from a pulsator.

When vacuum is applied to an animal's teats, a lower than atmospheric pressure exists within the animal's udder. When the animal gives milk faster than the milking system can transport the milk away from the teats resulting in a blocking or interfering with the vacuum, a flooding situation occurs resulting in the vacuum being blocked from the teats and udder. The udder is under the operating vacuum level equal to the source before the flooding occurs when flooding occurs, an at atmospheric pressure is bleed into the milk claw. The vacuum level within the milk claw drops because the flooding blocks the source of vacuum from the milk claw. This results in the loss of vacuum to the teats and udder. The udder seeks to return to the ambient atmospheric pressure from the original vacuum level. As a result, air will then fill the vacuum. The filling of the vacuum within the cowl's udder causes a foreign air to be introduced into or drawn into the cow's udder. Air does not typically carry a detrimental amount of foreign bacteria, but air under a pressure differential functions as a propellant for bacteria. As such, air itself does not cause significant detriment to the health of the animals, e.g. cow, but the air may transport bacteria or other contaminants into the teats.

Another phenomenon exists that is detrimental to the animal. The liner of the milking apparatus or inflation creates a seal between atmospheric air outside the cow from the vacuum which is at lower than atmospheric air inside of the inflation and ultimately into the cow's udder. Typically, the inflation is sealed around the cow's udder by body flesh. The cow's udder is always contaminated with bacteria because of the animal's environment. Most often, the animal is only washed before milking. Since only water is used to wash the udder and the udder is not sanitized, water typically is a carrier of bacteria from outside of the udder.

If the vacuum seal breaks and water carrying bacteria is present around the udder, the water outside of or in the vicinity of the inflation and air at atmospheric pressure is drawn or sucked into the teats through the teat orifice.

To overcome such prior art, the inflations and milking systems have been designed to resist breakage of the vacuum seal. Also, sanitizers have been developed to sanitized the cow's udder before milking. Further, milk claws have been designed to direct air, milk, water or other material away from the milk flow and away from the cow's teats to minimize the introduction or drawing of bacteria into the teat orifice.

As discussed above and as shown by the prior art, animals, such as cows, are being milked with greater and greater vacuum levels in order to decrease milking times and to form a tighter seal around the inflation and cow's teat to reduce "squawking", e.g. air admission into the test created by a broken vacuum seal.

It is known in the art that higher levels of vacuum, although helping in decreasing the milking time, also cause irritation to the animal and are undesirable to overall animal's health and mammary system. Nevertheless, many milking systems have increased vacuum to reduce milking time and to reduce "squawking". Such milking systems have done so by forfeiting the advantages of less irritation associated with lower vacuum levels.

Typically, animals, especially cows, are giving more milk at faster milk flow rates. The sizes and design of the state-of-the-art entire milking system are generally inadequate to handle the volume of milk without some degree of, and often severe, flooding. Flooding continually causes reverse pressure differentials and collapse of vacuum. The milk fluid, in effect, causes the average vacuum level within the claw, liners and teat end to be much lower than the desired vacuum level due to continual flooding which interrupts the vacuum and causes undesired pressure differences on the teats. The present predominate solution is to continue to raise and/or dynamically change the vacuum levels.

It is important to note that the "average" vacuum level used to milk a cow is lower than that of the preset vacuum level of the vacuum source. However, at times when the cow is not giving milk at a fast rate, the cow is being exposed to the differential in pressure between the higher levels of vacuum. Several of the known milking systems and apparatus include valves, control means or the like to control vacuum levels as a function of milk flow rates as a means to solve such problems.

SUMMARY OF THE PRESENT INVENTION

None of the known state-of-the-art milking system combine using lower vacuum level with a milk claw and milk transportation conduit having a large milk carrying capacity without requiring a sensing or control system to regulate, control or monitor vacuum levels. Further, none of the known prior art systems provide for reducing mastitis and managing milk flow rates at high pounds per hour reducing irritation to the teats milk flow rates.

The present invention overcomes the problems of the prior art by providing a novel and unique milking system having a substantially stabilized vacuum level particularly in the milk apparatus, milk claws and milk hose components of the milking system. The preferred embodiment of the milking system of the present invention includes a milking apparatus for connection with a cow's teats to apply a controlled vacuum to the end of the teat to remove milk therefrom. A milk claw is operatively connected to the milking apparatus to receive and pass said milk under a continuous vacuum. The milk claw includes an outlet having side walls and a predetermined cross-sectional area selected to be in the range of a minimum cross-sectional area for maintaining, at all milk flow rates, a substantially uniform laminar flow of milk therethrough and for concurrently providing a stable continuous vacuum in a vacuum channel between the laminar flow of milk and the interior side walls of said outlet and a maximum cross-sectional area equal to about 1.5 times the minimum cross-sectional area.

In an alternate embodiment of the present invention, the milk claw further may include a control orifice for controllably admitting atmospheric pressure to the milk claw for controlling the vacuum level within the milk claw outlet. It is also envisioned that a control orifice could be formed into the inflation rather than the milk claw or that both the inflation and milk claw could have a control orifice. A milk transportation conduit may include a semi-flexible conduit and other in line devices, such as for example a control device for measuring milk flow or for shutting off vacuum at the end of milking. In the preferred embodiment, the milk transportation conduit has a milk hose having interior side walls and a predetermined cross-sectional area substantially equal to the predetermined cross-sectional of the outlet of the milk claw. Since all of the milk system components from the milk claw to the milk line have substantially the same predetermined cross-sectional area, a continuous vacuum channel is continuously present enabling the milk to be transported while maintaining a substantially uniform laminar flow of milk at any flow rate. The size of the vacuum channel will, of course, vary and be the smallest at maximum milk flow.

One advantage of the present invention is that the milking system may include, in an alternative embodiment, a milking claw having a calibrated orifice to apply atmospheric pressure to the milking claw to maintain the vacuum of the milking apparatus at stabilized, continuous vacuum level and an outlet having a preselected diameter to maximize the milk flow rate while concurrently providing a continuous vacuum channel to maintain a substantially stable continuous vacuum level during the milking cycle of an animal. In the alternative, a control orifice can be formed in the inflation or both the milk claw and inflation may have a control orifice.

Another advantage of the present invention is that the milking system provides for faster milking during lactation.

Another advantage of the present invention is that the milking system provides faster milking of animals resulting in greater production through the lactation cycle.

Another advantage of the present invention is that the prolonged used of the milk claw of the preferred embodiment resulted in an improvement of the health of the animal or cow.

Another advantage of the present invention is that the prolonged use of the milk class of the preferred embodiment resulted in an improvement of the health of the animal or cow.

Another advantage of the present invention is that any collapsing of the vacuum or vacuum channel is eliminated which avoids the necessity of the milking system overcoming or compensating for vacuum loss and vacuum recovery delays during a milking cycle.

Another advantage of the present invention is that the milking claw milk hose and all accessories forming part of the milk transport conduit have a stable continuous vacuum level at all flow rates.

Another advantage of the present invention is that several of the significant causes of mastitis is eliminated which leads to greater immediate production and production increases throughout the life of the animal or cow.

Another advantage of the present invention is that life of the animal or cow continuously over a long term, say in the order of 1 year or more, exposes the animal or cow to lower ranges of variations of vacuum fluctuations resulting in improved condition of the teats of the animal or cow.

BRIEF DESCRIPTION OF THE DRAWINGS

These and other advantages of the invention will be readily apparent when considered in light of the detailed description hereinafter of the preferred embodiment and of the drawings which include the following figures.

DESCRIPTION OF THE PREFERRED EMBODIMENT

Before proceeding with the description of the preferred embodiment, the following background will be helpful in understanding this invention.

When a cow enters a milking barn or milking parlor, such as a herring bone style milking parlor, and the milking machine is connected to the animal's body, the body starts to react in preparation for "letting down" of the animal's, e.g. cow's, milk. A natural process takes place wherein the animal produces within the animal's blood stream a chemical called "oxitosin". This chemical works its way down into the udder causing the ovili cells to contract. In essence, contraction of the ovili cells causes a squeezing effect to help push out, expel or withdraw the animal's milk. The period of time the animal produces this oxitosin is limited, and recent research suggests somewhere between 4 minutes and 6 minutes on average.

Once an animal stops producing oxitosin, it becomes difficult, if not impossible, to withdraw or remove any remaining milk from the animal. When milk is left in the udder of the animal, nature "tells" the animal's body that it does not need to produce as much milk. Therefore, when this happens the animal's body will level off milk production and eventually decreases production during that lactation.

When a cow begins lactation, the cow increases its production of milk each day as a natural response to "feed" the animal's growing baby calf. At some time during that lactation, the cow will naturally level off and then begin a decrease in production. This is nature's way of "weaning" off the calf.

With this in mind, one can conclude it is important to withdraw all the milk an animal can produce, otherwise the animal will respond to nature the next day and produce less milk. Realizing that the oxitosin producing process is directly related to milk production, it is important that the milk be withdrawn during the period of time the animal is "naturally" willing to give milk otherwise the milk will be lost.

Since the lactation cycle plays an important role during milking, failure to withdraw all of the milk produced each day will not only lead to a loss of that day's production, but could reduce the full production potential of the animal or cow during the animal's entire lactation life. Therefore, losses of production are compounded if all of the produced milk is not removed during a milking cycle.

The milking system using the teachings of this invention not only captures and relies on the importance of lactation cycles, but is able to milk the cow faster at a substantially stable continuous vacuum level. Faster milking of an animal allows all the milk to be extracted within the oxitosin production period and most importantly when the animal is willing to give milk production.

Figure 1:
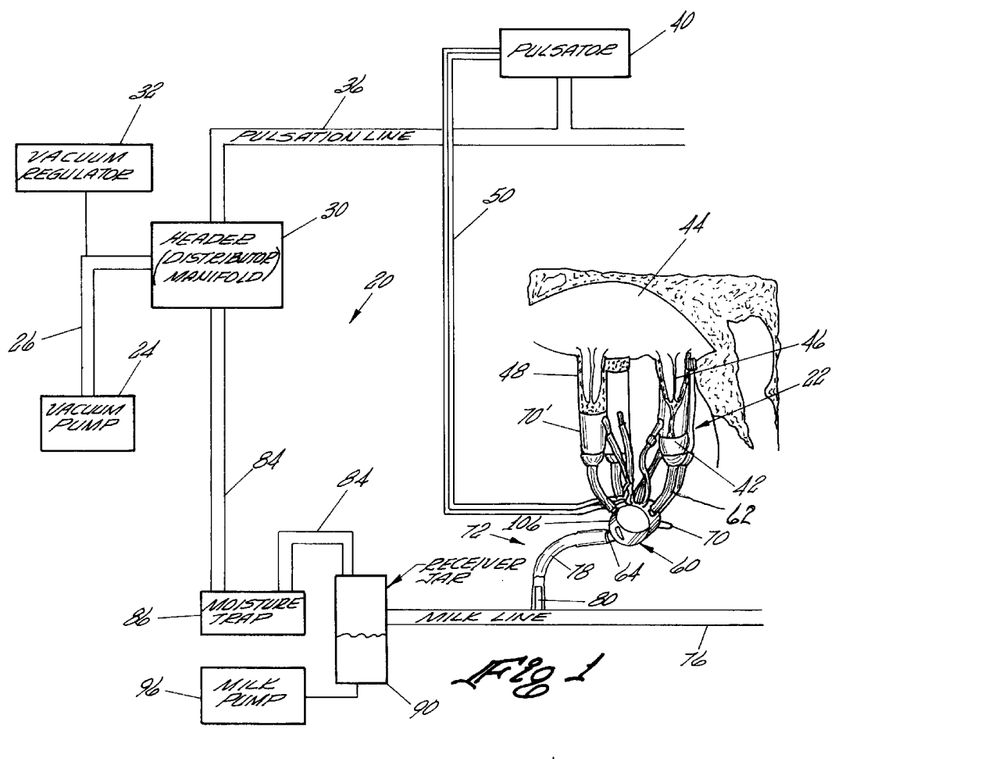
FIG. 1 is a pictorial representation of a milking system illustrating the milking apparatus, milk claw, milk hose, control device, milk line and associated components of the milking system.
Figure 2:
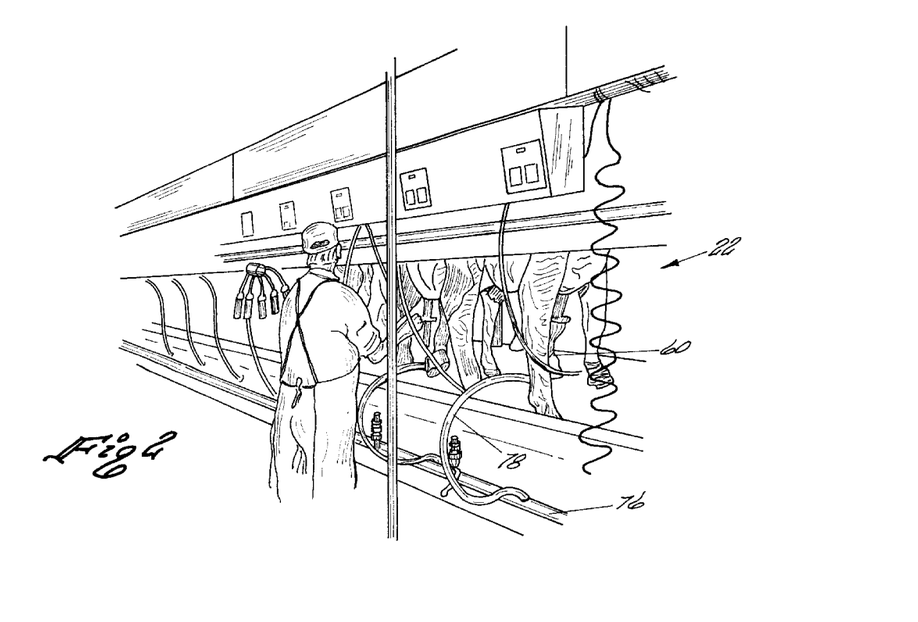
FIG. 2 is a perspective front, top and right end view of a milking parlor utilizing a milking apparatus having a milk claw using the teachings of this invention.

A pictorial drawing of FIG. 1 illustrates a milking system showing generally as 20 which is installed in a milk parlor operation having a plurality of vacuum-operated milking machines shown generally as 22 in individual stalls. FIG. 2 illustrates the typical milk parlor barn showing individual stalls and the placement of the milking apparatus relative to the cows to be milked.

In FIG. 1, a source of vacuum is provided to the milking system by vacuum pump 24 through a vacuum conduit 26 to a vacuum manifold header 30. A vacuum regulator 32 is operatively connected to the vacuum conduit 26 to control the maximum vacuum that would be applied to the milking system. Typically, the vacuum level in a milking system is in the order of 12 inches of Hg (12" Hg).

The vacuum manifold header 30 is operatively coupled by a pulsation line 36 to a pulsator 40.

The pulsation line 36 is generally a plastic or steel line that carries vacuum, equal to the desired preset vacuum level, to the pulsator 40. Pulsation line 36 must be adequately sized to carry air away from the pulsator without allowing a drop in vacuum (lower than the milking vacuum level).

The pulsator 40 is a device that intermittently draws air through flexible conduit 50 from within the shell (outside the liner) of the inflation 42 and creates a vacuum to "pull" to "open" the inflation 42 away from or releasing the teat of the cow making the teat open so that the vacuum from the milk claw draws milk down thorough the teat. This is referred to as a "milk period". Alternatively, atmospheric pressure is applied by the pulsation 40 to the liner to "push" or "close" the inflation 42 against the teat of the cow closing off the teat. This is referred to as a "rest period". The pulsator 40 periodically draws air out of the inflation 42 to create a this cycle of opening and closing of the liner. This creates a situation of milking (teat under vacuum) and rest (teat not under vacuum).

As illustrated in FIG. 1, the vacuum pump 24 removes air from the milking system to create less than atmospheric pressure within the milking system. The vacuum manifold header 30 is essentially a distribution manifold that allows both the milk line 76 and pulsation line 36 to have equal access to the vacuum source, which in this embodiment is a vacuum pump 24 and vacuum regulator 32.

The vacuum regulator 32 is a vacuum level controller which is a device that maintains a predetermined or preset vacuum level within the milking system 20. A typical vacuum pump 24 has capacity to draw vacuum levels lower than the levels desired in the basic milking system 20. The vacuum regulator 32 includes an air inlet to vary or balance the capacity of the vacuum pump 24 or to change the air introduced into the milking process during normal operation. At times when the milking system 20 is intermitting air equal to the vacuum pump 24, the vacuum controller or vacuum regulator 32 will be off (no air inlet). When the milking system is intermitting air less than the capacity of the vacuum pump 24 capacity, the vacuum regulator 32 will open and "make-up" the difference to maintain a constant and predetermined level of vacuum into the milking system 20 equal to the capacity of the vacuum pump 24.

Referring back to FIG. 1, the milking apparatus shown generally as 22 has the inflations 42 which define the teat engaging portion of a teat cup cluster. The milking apparatus 22 is adapted to have the inflations 42 operatively connected or operatively attached with an animal's udder, such as for example a cow's udder 44, having teats 46 to apply a controlled vacuum to the teats 46 to remove milk therefrom. The inflations 42 include a shell and liner 48 which have an "open" and "closed" position depending upon the vacuum pressure applied thereto as described hereinbefore. The vacuum pulsator 40 is operatively connected by a flexible vacuum lines 50 to control the shell and liner 48.

The shells and liners 48, comprises two components. The first component is a liner which is a soft rubber tube that goes around the cowl's teat 46 to seal it off from atmospheric pressure to allow the vacuum to draw milk from the cow's udder 44. The other component is a shell which is a rigid device that houses the liner and can seal the outside of the liner from atmospheric pressure. The shells and liners 48 cooperate to selectively or controllably apply vacuum to the cow's udder 44 and teats 46 to withdraw the milk.

A milk claw 60, is operatively connected to the inflations 42 by means of flexible tubing 62, to receive milk from the inflations 42 at various milk flow rates. The milk claw 60 receives and passes the milk under a stabilized continuous vacuum in a vacuum channel at a selected vacuum level and, most importantly, at peak milk flow rates. The milk claw 60 includes an outlet 64 having side walls and a predetermined cross-sectional area selected to be in the range of: (i) a minimum cross-sectional area for maintaining at all milk flow rates a substantially uniform laminar flow of milk therethrough and for concurrently providing a stabilized continuous vacuum in a vacuum channel between the laminar flow of milk and the interior walls of the outlet 64; and (ii) a maximum cross-sectional area equal to about 1.5 times the minimum cross-sectional area of the outlet 64.

In the preferred embodiment, the milk claw 60 has four (4) inflations 42 since a cow has (4) four teats. The inflations 42, under controlled vacuum pressure from the pulsator 40, extracts milk from the cow's udder 44 as described hereinbefore. The milk claw 60 functions as a manifold device (claw) that brings the milk from four inlets into single outlet.

The milk claw 60 further may optionally include a control orifice 70, which is in the form of a calibrated orifice, for controllably admitting atmospheric pressure to the milk claw 60. Control orifice to functions for controlling the vacuum level within the milk claw outlet 64. Also, the milk claw 60 has a housing 66 that has a central chamber 104 defined by sidewalls 106.

In the alternative, the inflations 42 may optionally include a control orifice shown as 70'. Also, both the milk claw 60 and the inflation 42 may each have a control orifice 70 and 70' respectively, as the case may be.

It is desirable to intermit air to the vacuum system at this point in the milk claw 60 as the cow produces fluid milk, it would otherwise be difficult to transport the milk away from the cow without approaching flooding. Therefore, the milk claw 60 may have an air bleed port or control orifice 70 formed therein.

The milk claw outlet 64 is operatively connected by a milk transport conduit, shown generally as 72. The milk transport conduit 72 includes a semi-flexible hose 78 operatively connected to a nipple inlet 80 of a milk line 76.

The term "milk transport conduit" is intended to cover any flexible conduit material such as a semi-flexible hose having a cross-sectional area substantially equal to the cross-sectional area of the outlet 64.

The term "milk transport conduit" is intended to also include any other intermediate in line components, devices, control apparatus or the like (such as, for example, a milk flow measuring device for terminating or shutting off the vacuum at the end of a milking cycle 82 shown in FIG. 1) vacuum sensing devices and the like. In accordance with the teachings of this invention, is essential that all such devices, controls and components have a cross-sectional area substantially equal to the predetermined cross-sectional area of the outlet 64. Otherwise, interruption of the vacuum channel will occur caused by flooding and loss or collapse of the vacuum.

Typically, known prior art control or monitoring devices have inlets and outlets of different cross-sectional sizes or have a passageway or channel that has a reduced internal dimensions. Such devices can cause flooding of milk during maximum milk flow rates blocking the vacuum channel causing a collapse of the vacuum. These devices typically contribute to delay times required in a milking system in order to return to the operating vacuum level, generally referred as vacuum recovery. For these reasons, it is anticipated that this invention likewise covers such control or monitoring devices that have a cross-sectional area that is substantially equal to that of the outlet 64 used in the milking system using the teachings of this invention.

In the embodiment illustrated in FIG. 1, the milk transportation conduit is in the form of a semi-flexible clear plastic hose 78 which is operatively connected to an inlet nipple 80 of the milk line 76. In the preferred embodiment, the semi-flexible hose 78 is a plastic or rubber hose connecting the milking claw outlet 64 to the inlet nipple 80 as described above.

In accordance with the teachings of this invention, the cross-sectional areas of the milk hose 78 and the inlet nipple 80 are each substantially equal to that of the outlet 64.

The milk line 76, commonly referred to as a milk transfer line, is in the form of a stainless steel line with adequate capacity to carry vacuum to the cow from the vacuum source 26. The vacuum manifold header 30 applies vacuum via a conduit 84 and a moisture trap 86 to a receiving vessel such as a receiving jar 90 which is in the form of an enclosed vessel functioning as a vacuum chamber. The receiving jar 90 is operatively connected to a milk pump 96 to remove the milk collected in the receiving jar 90.

The milk line 76, under a vacuum which is applied thereto through the receiving jar 90, transports the milk away from the cow to the receiving jar 90 where it is accumulated and pumped away by milk pump 96.

It is important for the milk transfer line 76 to have enough capacity to carry milk away from all individual milking apparatus 22 while still leaving adequate capacity to form a vacuum channel for unrestricted, stable, continuous closed vacuum system to the cow's udder 44.

The milk transfer line 76 and receiver jar 90 must be sized to have enough capacity such that the milk flow will not fill the line, e.g. flood the line, which would block the vacuum channel and flow of vacuum to the milking apparatus 22 operatively connected to the cow's udder 44.

In addition, the location of the receiving jar 90 affects the vacuum variation. If the lifting height in 0 inches, the vacuum fluctuations are within a narrow range of fluctuations. If the lifting height is in the order of 12 inches, the vacuum fluctuations are over a wider range of fluctuations.

DESCRIPTION OF OPERATION

In operation, the milk line 76 is under a vacuum which is transported through a vacuum channel in the milk hose 78 and milk claw 60 through the inflation to the cow's udder 44. The pulsator 40 periodically applies vacuum to the inflation forming the "milk period" and "rest period". During the "milk period", the vacuum is what "draws" the milk from the cow. If a vacuum was constantly applied on the cow's udder, the udder could be damaged. Therefore, it is necessary to "turn off" that vacuum at regular intervals during the milking process. Typically, that is on/off (milk/rest) ratio which is about between about 50% on—about 50% off to about 70% on—about 30% off. These cycles are typically in the order of between about 40 to about 60 times per minute.

This on/off cycle occurs within the inflation such that when the vacuum passing through the vacuum channel of the milk line 76 reaches the inflation 42, the inflation collapses under that vacuum and pinches off vacuum to the cow's udder 44. To open the inflation, the pulsator 40 applies an equal vacuum to the outside of the inflation 42 and pulls it open causing vacuum to flow to the cow's udder and retract the animal's milk. As the inflation 42 opens, vacuum will draw the milk from the cow's udder 44 where it is ultimately transported to the milk receiving jar 90. To help move the milk thorough the system, one or more air bleed ports or control orifices are introduced in the system as discussed above including within the milking claw 60.

In the illustration of FIG. 2, a milking parlor includes a plurality of milking apparatus 22 which are located in each stall of the milking parlor, one for each animal. The milk claw 60 has its outlet 64 operatively connected a milk hose 78.

Figures 3, 4, 5:
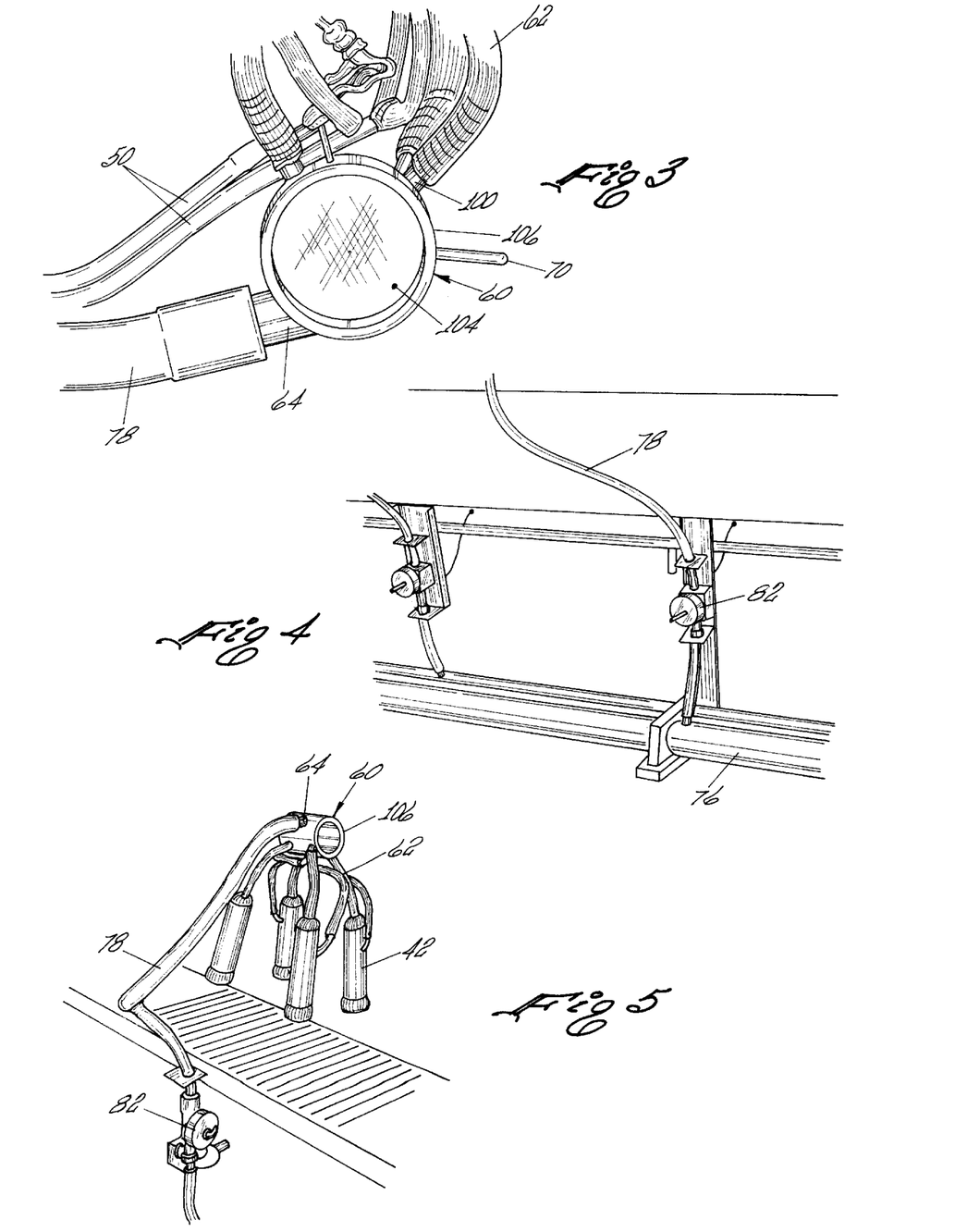
FIG. 3 is a front elevational view of a milk claw of the present invention including an outlet having a preselected cross-section area to provide for vacuum channel to facilitate a stable, continuous vacuum.
FIG. 4 is a front elevational view showing a milk hose having a milk flow control device forming part of the milk hose and wherein the milk hose is operatively connected to an inlet nipple of a milk line, all having a cross-sectional area substantially the same as that of the milk claw outlet.
FIG. 5 is a front elevational view of an inverted milking apparatus having the milk claw which utilizes the teachings of this invention.

FIG. 3 shows in greater detail the front elevational view of the milk claw 60. The milk claw 60 has a four inlets 100 which are operatively connected by a flexible hoses 62 to the inflations 42 (visible in FIG. 1). Milk from each inflation 42 is passed through an inlet 100 into a central chamber 104 of milk claw 60. Central chamber 104 is defined by the thin outer wall 106 which may optionally have a control orifice 70 in the form of an elongated cylinder having a central opening extending therethrough, operatively connected thereto. Orifice 70 communicates with the central chamber 104. The outlet 64 is operatively connected to the milk hose 78.

Also, FIG. 3 shows the flexible vacuum lines 50 which extend from the pulsator 40 and are operatively connected to the inflations 42 to "open" the vacuum within the shell and liner 48.

As stated hereinbefore, the outlet 64 has a preselected cross-sectional area to provide for a continuous vacuum channel which is used to maintain a substantially level stable, continuous vacuum.

In FIG. 4, the milk hose 78 is operatively connected to the inlet nipple 80 (shown in FIG. 1) of the milk line 76. A milk flow in line measuring device 82 which is capable of shutting off the vacuum at the end of a milking cycle is also operatively coupled to the milk hose 78. As stated hereinbefore, the milk hose 78, the control device 82 and inlet nipple 80 each have a cross-sectional area substantially equal to or the same as that of the milk claw outlet 64.

Figure 6:
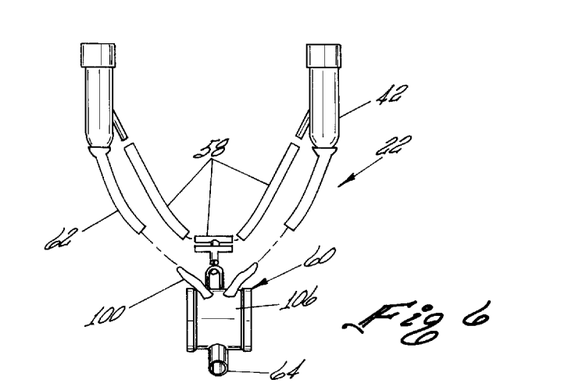
FIG. 6 is diagrammatic assembly view of the milking apparatus having a milk claw of the present invention as illustrated in FIG. 5.

FIGS. 5 and 6 illustrate the structural relationship between the milk claw 60, the flexible hoses 62 which operatively connect the inflations 42 to the inlets 100 of the claw 60, the central chamber 104, the outlet 64 and milk hose 78.

FIG. 6 illustrates the various components of a milking apparatus 22 having a milk claw 60 which is adapted to have the outlet 64 operatively connected to the milk hose 78. Milk hose 78 is operatively connected to the inlet 80 of the milk line 76 as shown in FIG. 3.

The milk claw 60 is operatively connected to inflations 42 which are operatively connected to the pulsator lines 58. The outlets 100 of the milk claw 60 are operatively connected to hose 62. The milk withdrawn by the inflations 42 from the teats is collected in the interior of the housing defined by sidewalls 106. Vacuum is applied through outlet 64, the milk claw 60 and hoses 62 to the inflations when the pulsator applies an "off" pulse to the inflations 42 through the pulsator line 58.

OPERATING EXAMPLE

In order to explain the operation of the milking system 20 using the teachings of the present invention, the following operating example is provided.

Typically, in a milking system 20, the preset vacuum level is established at approximately 12 inches Hg (12" Hg). A milking cycle of a cow to be milked using the present invention may be in the order of about 6 minutes. During the milking process, approximately 45 pounds of milk may be withdrawn from the cow. The relationship of pounds per minute for each minute of the milking cycle for the above example is as follows:

TABLE 1

| Minute of Milking Cycle | Pounds of Milk per Minute (lbs/min) | Cumulative Pounds of Milk Withdrawn During Milking Cycle |
| --- | --- | --- |
| Minute 1 | 5 | 5 |
| Minute 2 through Minute 4 | 12 | 36 |
| Minute 5 and Minute 6 | Approximately 2.5 | 45 |

Figure 7:
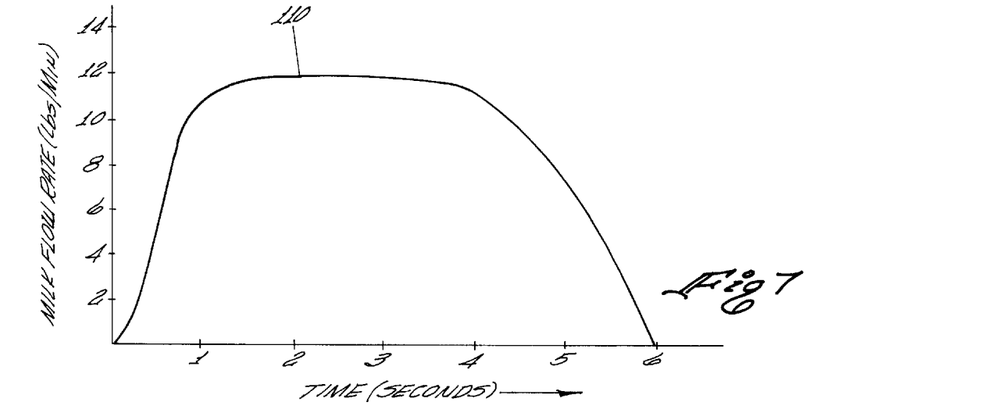
FIG. 7 is a chart plotting the milk flow rate as a function of time during a typical milking cycle of a cow.

Referring now to the chart illustrated in FIG. 7, the chart plots as curve 100 the milk flow rate as function of time during the above described milking cycle of a cow using the data set forth in Table 1 above. Curve 100 shows that at the beginning of the milking cycle that maximum flow rate is reached with a minute or so. However, it takes about two minutes or so at end of the cycle to reduce to a zero flow rate. For purposes of discussion of this example, the milking cycle of 6 minutes will continue to be used.

Figure 8:
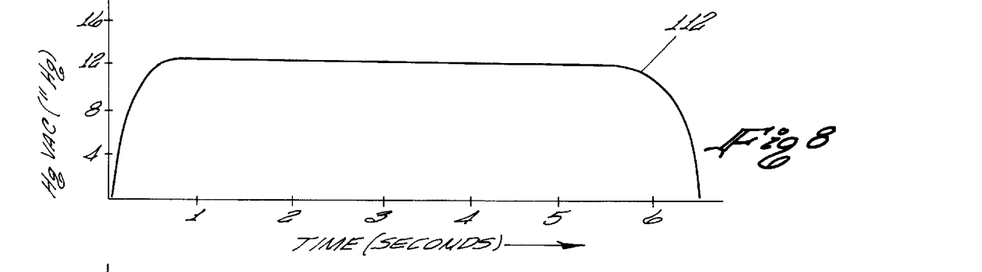
FIG. 8 is a chart plotting vacuum level of the vacuum source as a function of time during normal startup, operation of and shut-down of the vacuum system illustrated as part of FIG. 1.

In the chart illustrated in FIG. 8, the chart plots as curve 112 vacuum level operation established by the vacuum source as a function of time during normal startup operation and shut-down of the vacuum system during a 6 minute milking cycle. As illustrated, by curve 112 in FIG. 8, when the vacuum is turned on, it immediately reaches a preset vacuum level of 12 inches Hg (12" Hg) which is the desired vacuum level and remains at that level until the end of the milking cycle.

Figure 9:
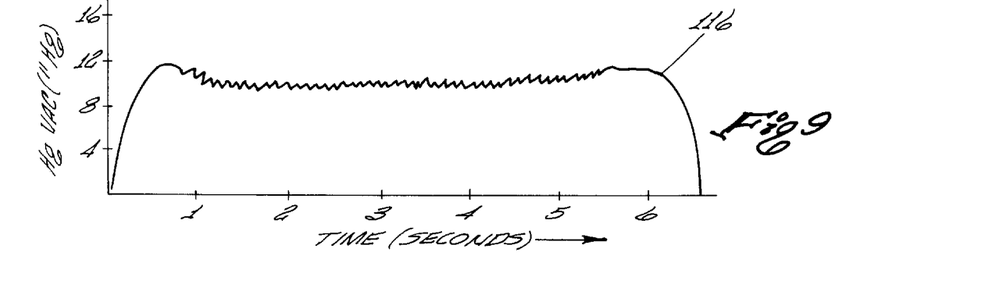
FIG. 9 is a chart plotting vacuum level as a function of time illustrating operation of a milk claw and milking system which does not incorporate the teachings of this invention.

Absent the use of a milk claw not incorporating the teachings of the invention of the present invention, the chart of FIG. 9 illustrates that the vacuum level plotted as a function of time, which is illustrates by curve 116, drops down to approximately 10 inches Hg (10" Hg) of vacuum level with peak-to-peak excursions having amplitudes varying between approximately 0.5 inches Hg (0.5" Hg) and 1.5 inches Hg (1.5" Hg). A decrease from the desired vacuum level of 12 inches Hg (12" Hg) to about 10 inches Hg (10" Hg) occurs during the first minute of the milking cycle as the milk flow rate increases from approximately 5 pounds per minute, at one minute of the cycle, to approximately 12 pounds per minute at Minutes 2 through 4 of the cycle. The peak-to-peak excursions of the vacuum level are caused by the flooding of the milk claw outlet and milk hose which interrupts the vacuum. As the milk flow rate declines to approximately 2.5 pounds per minutes during Minutes 5 and 6, the vacuum level again approaches the preset level of 12 inches Hg (12" Hg) until the end of the milking cycle.

Figure 10:
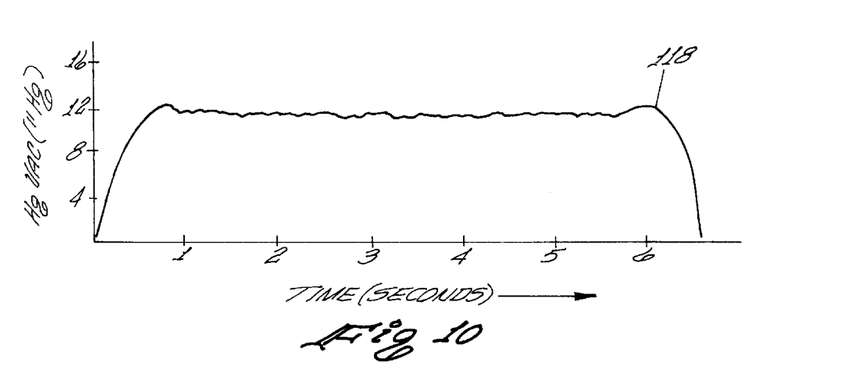
FIG. 10 is a chart plotting vacuum level as a function of time illustrating operation of a milk claw and milking system which incorporates the teachings of this invention.

In the chart of FIG. 10, the chart plots vacuum level as a function of time when a milk claw 60 having an outlet 64 having a preselected cross-sectional area within the range of minimum and maximum cross-sectional areas described hereinbefore. As illustrated by curve 118, during the Minute 1 the preset vacuum level of 12 inches Hg (12" Hg) is reached. As the milk flow rate increases and reaches maximum flow during Minutes 2 through 4, the vacuum channel in the outlet 64 and milk hose 78 is not cut off. Thus, a surge of milk at the high milk flow rates will not block the milk claw 60, will not block the milk claw outlet 64 or will not block the milk hose 78. As a result, the vacuum level has less peak-to-peak excursions in amplitude as compared to the peak-to-peak excursion illustrated by curve 116 in FIG. 9. As shown in FIG. 10, the average vacuum level remains at approximately 11.5 inches Hg (11.5" Hg) or about 0.5 inches Hg (0.5" Hg) fluctuations. However, other variables, such as the lifting height of the milk, the cross-sectional area of the milk claw outlet and the number of curves in the piping system and the smoothness of the interior surfaces all affected the range of vacuum fluctuations.

Evaluation cluster stability tests were conducted using the teachings of this invention. The basic milking system used a milk claw, hose, milk line inlet and sensors as specified below in the Examples. The inside diameter of the hose was substantially equal to that of the milk claw outlet and the total length of the hose was 90 inches. The tests used two lift height variables to which the milk was lifted, 0 inches and 12 inches. The pulsation cycle was a 60/40 (60% on time, 40% off time). The rate was 60 cycles per minute. The cycle components for the vacuum pulse using a standard vacuum pulse (the wave form of which is illustrated at page 258 of the Bramley et al Reference) were:

a=17;

b=43;

c=17; and d=23.

Data was obtained using a WDR Digimet measuring system. In Examples 1 through 4, there were no sensors in line. In Examples 5 through 8, there were sensors in line at the locations set forth in the applicable Example.

Using the above criteria, set forth below are Examples of the results of the test conducted for evaluating stability cluster stability.

EXAMPLE 1

This Example 1 has the following system specifications:

Milk Claw=⅝ inch

Hose inlet=⅝ inch ID

Lift=0 inches

Line Milking Vacuum=12.50 inches of Hg

The tests results are as follows:

| Lift/ Inches | Milk Flow Rate/ Gallons per Minute | Maximum Vacuum Level/ Inches of Hg | Minimum Vacuum Level/ Inches of Hg | Fluctuation Range/ Inches of Hg |
|---|---|---|---|---|
| 0 | 0.50 | 12.73 | 12.39 | 0.34 |
| 0 | 1.00 | 12.93 | 11.41 | 1.52 |
| 0 | 1.50 | 12.98 | 11.38 | 1.60 |
| 0 | 2.00 | 12.95 | 11.03 | 1.92 |

Figure 11:
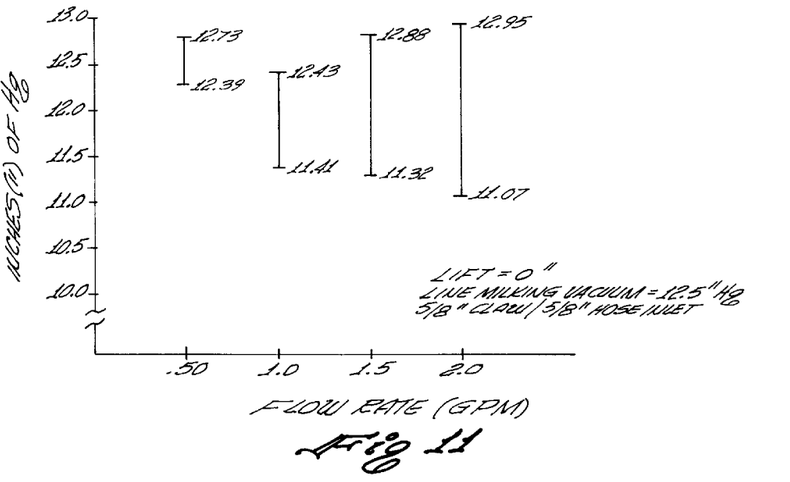
FIG. 11 is a graph showing ranges of vacuum pressure variations in inches of Hg verses flow rates of milk in gallons per minute for a ⅝ inch milk claw and ⅝ inch hose using the teaching of this invention at a lift of 0 inches and a line milking vacuum of 12.50 inches of Hg.

FIG. 11 is a graph showing the range of vacuum pressure variations in inches of Hg verses flow rates of milk in gallons per minute for the above described Example 1.

The evaluation cluster study for Example 1 and as depicted in FIG. 11 shows that the vacuum line fluctuations are under 2 inches of Hg, with the fluctuation range being in the order of about 1.5 inches of Hg at 1.00 gpm to 1.5 gpm flow rates.

EXAMPLE 2

This Example 2 has the following system specifications:

Milk Claw=⅝ inch

Hose inlet=⅝ inch ID

Lift=12 inches

Line Milking Vacuum=12.50 inches of Hg

The tests results are as follows:

| Lift/ Inches | Milk Flow Rate/ Gallons per Minute | Maximum Vacuum Level/ Inches of Hg | Minimum Vacuum Level/ Inches of Hg | Fluctuation Range/ Inches of Hg |
|---|---|---|---|---|
| 0 | 0.50 | 12.94 | 10.88 | 2.06 |
| 0 | 1.00 | 13.01 | 10.83 | 2.18 |
| 0 | 1.50 | 12.89 | 10.81 | 2.08 |
| 0 | 2.00 | 12.91 | 10.39 | 2.52 |

Figure 12:
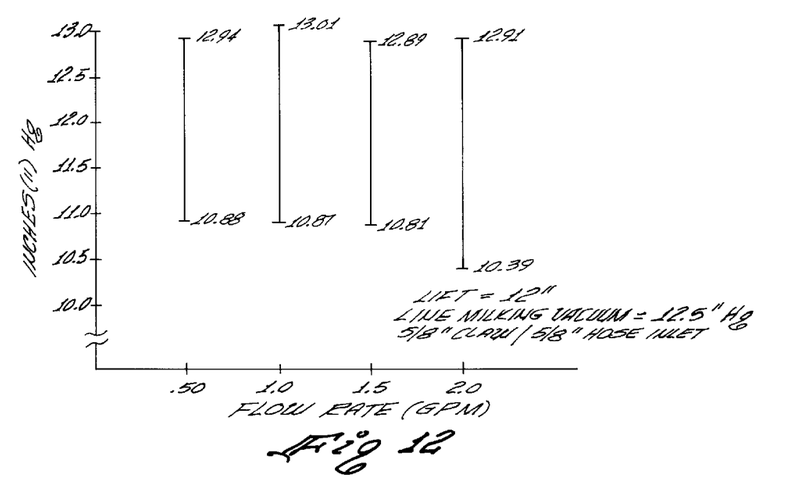
FIG. 12 is a graph showing ranges of vacuum pressure variations in inches of Hg verse flow rates of milk in gallons per minute for a ⅝ inch milk claw and ⅝ inch hose using the teaching of this invention at a lift of 12 inches and a line milking vacuum of 12.50 inches of Hg.

FIG. 12 is a graph showing the range of vacuum pressure variations in inches of Hg verses flow rates of milk in gallons per minute for the above described Example 2.

The evaluation cluster study for Example 2 and as depicted in FIG. 12 shows that the vacuum line fluctuations are about 2.5 inches of Hg, with the fluctuation range being in the order of about 2.2 inches of Hg at 1.00 gpm to 1.5 gpm flow rates.

EXAMPLE 3

This Example 3 has the following system specifications:

Milk Claw=⅝ inch

Hose inlet=⅝ inch ID

Lift=0 inches

Line Milking Vacuum=13.50 inches of Hg

The tests results are as follows:

| Lift/<br>Inches | Milk Flow<br>Rate/<br>Gallons per<br>Minute | Maximum<br>Vacuum<br>Level/<br>Inches of Hg | Minimum Vacuum<br>Level/<br>Inches of Hg | Fluctuation<br>Range/<br>Inches of Hg |
|---|---|---|---|---|
| 0 | 0.50 | 13.61 | 13.20 | 0.41 |
| 0 | 1.00 | 13.74 | 12.73 | 1.01 |
| 0 | 1.50 | 13.85 | 12.37 | 1.48 |
| 0 | 2.00 | 13.59 | 12.06 | 1.53 |

Figure 13:
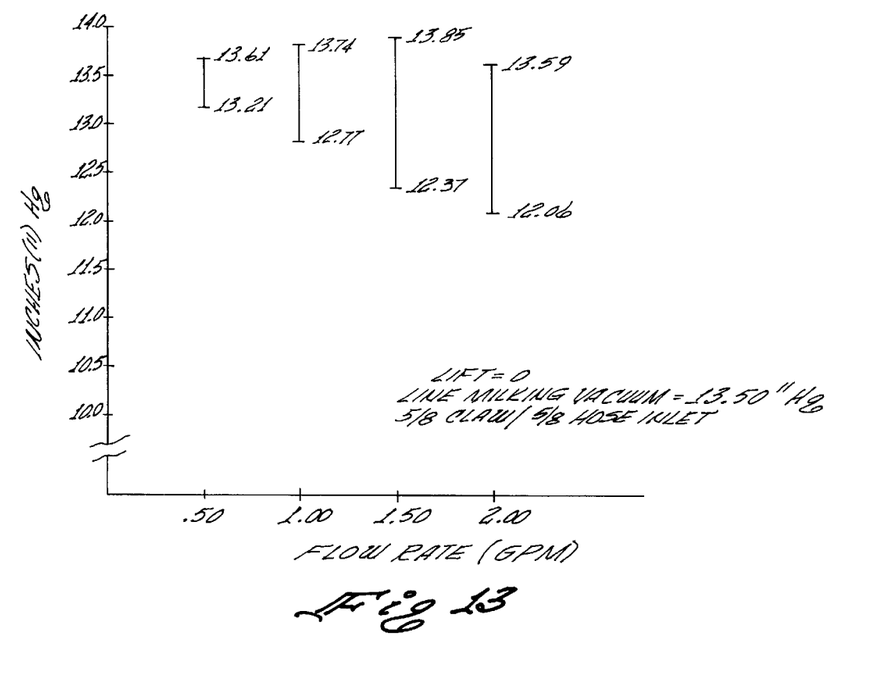
FIG. 13 is a graph showing ranges of vacuum pressure variations in inches of Hg verse flow rates of milk in gallons per minute for a ⅝ inch milk claw and ⅝ inch hose using the teaching of this invention at a lift of 0 inches and a line milking vacuum of 13.50 inches of Hg.

FIG. 13 is a graph showing the range of vacuum pressure variations in inches of Hg verses flow rates of milk in gallons per minute for the above described Example 3.

The evaluation cluster study for Example 3 and as depicted in FIG. 13 shows that the vacuum line fluctuations are under about 1.5 inches of Hg, with the fluctuation range being in the order of about 1.5 inches of Hg at 1.00 gpm to 1.5 gpm flow rates.

EXAMPLE 4

This Example 4 has the following system specifications:
Milk Claw=⅝ inch
Hose inlet=⅝ inch ID
Lift=12 inches
Line Milking Vacuum=13.50 inches of Hg
The tests results are as follows:

| Lift/<br>Inches | Milk Flow<br>Rate/<br>Gallons per<br>Minute | Maximum<br>Vacuum<br>Level/<br>Inches of Hg | Minimum Vacuum<br>Level/<br>Inches of Hg | Fluctuation<br>Range/<br>Inches of Hg |
|---|---|---|---|---|
| 0 | 0.50 | 13.80 | 11.62 | 2.18 |
| 0 | 1.00 | 13.90 | 11.77 | 2.13 |
| 0 | 1.50 | 13.68 | 11.77 | 1.91 |
| 0 | 2.00 | 13.59 | 11.52 | 2.07 |

Figure 14:
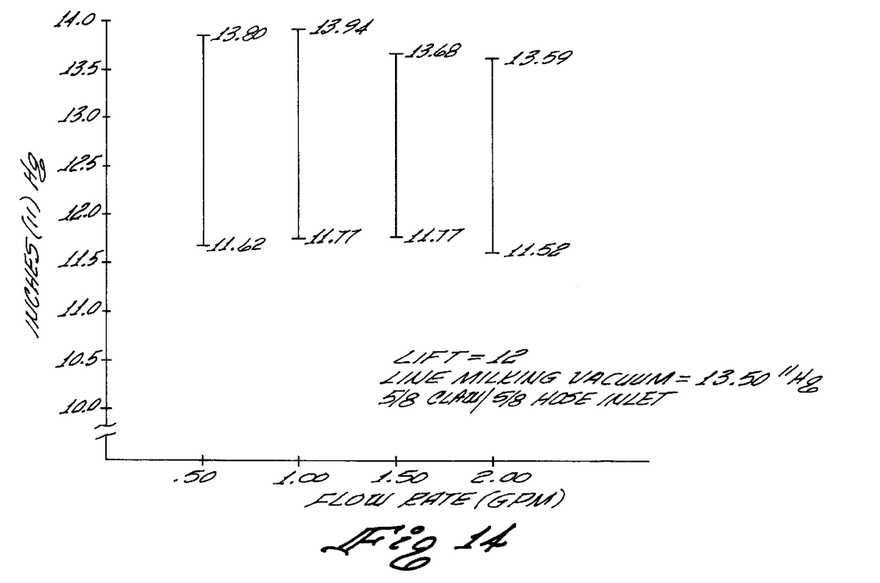
FIG. 14 is a graph showing ranges of vacuum pressure variations in inches of Hg verse flow rates of milk in gallons per minute for a ⅝ inch milk claw and ⅝ inch hose using the teaching of this invention at a lift of 12 inches and a line milking vacuum of 13.50 inches of Hg.

FIG. 14 is a graph showing the range of vacuum pressure variations in inches of Hg verses flow rates of milk in gallons per minute for the above described Example 4.

The evaluation cluster study for Example 4 and as depicted in FIG. 12 shows that the vacuum line fluctuations are about 2.2 inches of Hg, with the fluctuation range being in the order of about 2.1 inches of Hg at 1.00 gpm to 1.5 gpm flow rates.

EXAMPLE 5

This Example 5 has the following system specifications:
Milk Claw=⅞ inch
Hose inlet=⅞ inch ID
Sensor=⅞ inch ID located 24 inches from the milk line
Lift=0 inches
Line Milking Vacuum=12.50 inches of Hg
The tests results are as follows:

| Lift/<br>Inches | Milk Flow<br>Rate/<br>Gallons per<br>Minute | Maximum<br>Vacuum<br>Level/<br>Inches of Hg | Minimum Vacuum<br>Level/<br>Inches of Hg | Fluctuation<br>Range/<br>Inches of Hg |
|---|---|---|---|---|
| 0 | 0.50 | 12.64 | 12.38 | 0.26 |
| 0 | 1.00 | 12.69 | 12.36 | 0.33 |
| 0 | 1.50 | 12.72 | 12.15 | 0.57 |
| 0 | 2.00 | 12.66 | 11.92 | 0.74 |

Figure 15:
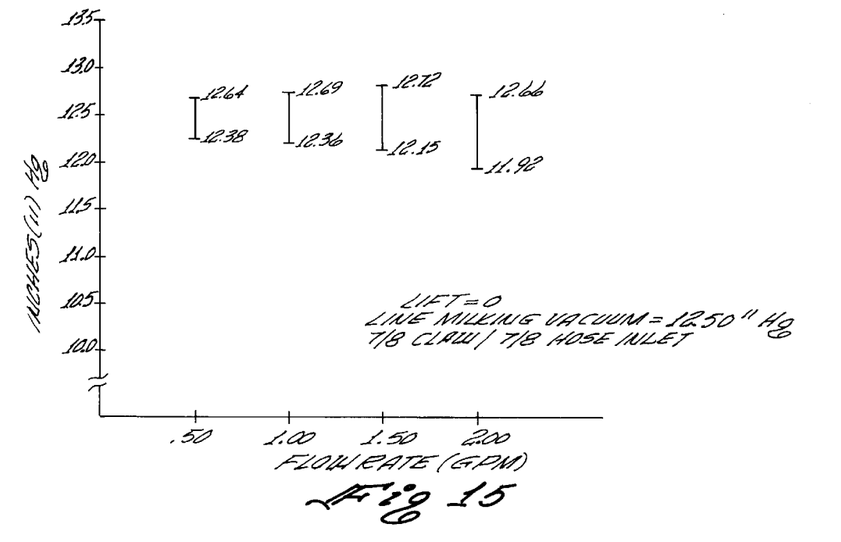
FIG. 15 is a graph showing ranges of vacuum pressure variations in inches of Hg verses flow rates of milk in gallons per minute for a ⅞ inch milk claw and ⅞ inch hose using the teaching of this invention at a lift of 0 inches and a line milking vacuum of 12.50 inches of Hg.

FIG. 15 is a graph showing the range of vacuum pressure variations in inches of Hg verses flow rates of milk in gallons per minute for the above described Example 5.

The evaluation cluster study for Example 5 and as depicted in FIG. 15 shows that the vacuum line fluctuations are under about 0.75 inches of Hg, with the fluctuation range being in the order of about 0.6 inches of Hg at 1.00 gpm to 1.5 gpm flow rates. This example represents the preferred embodiment of this invention due to lower range of vacuum fluctuations.

EXAMPLE 6

This Example 2 has the following system specifications:
Milk Claw=⅞ inch
Hose inlet=⅞ inch ID
Sensor=⅞ inch ID located 24 inches from the milk line
Lift=12 inches
Line Milking Vacuum=12.50 inches of Hg
The tests results are as follows:

| Lift/<br>Inches | Milk Flow<br>Rate/<br>Gallons per<br>Minute | Maximum<br>Vacuum<br>Level/<br>Inches of Hg | Minimum Vacuum<br>Level/<br>Inches of Hg | Fluctuation<br>Range/<br>Inches of Hg |
|---|---|---|---|---|
| 0 | 0.50 | 12.87 | 10.80 | 2.07 |
| 0 | 1.00 | 13.17 | 10.41 | 2.76 |
| 0 | 1.50 | 12.82 | 10.50 | 2.32 |
| 0 | 2.00 | 12.92 | 10.52 | 2.40 |

Figure 16:
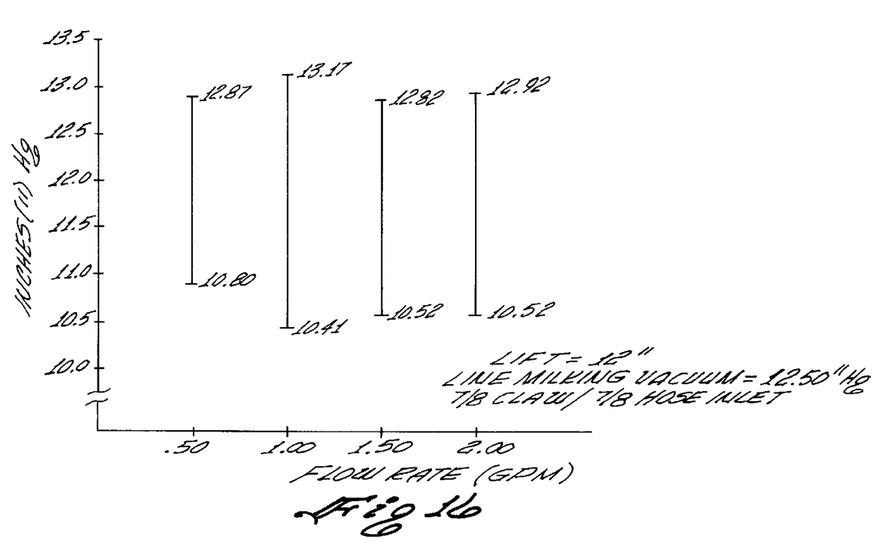
FIG. 16 is a graph showing ranges of vacuum pressure variations in inches of Hg verse flow rates of milk in gallons per minute for a ⅞ inch milk claw and ⅞ inch hose using the teaching of this invention at a lift of 12 inches and a line milking vacuum of 12.50 inches of Hg.

FIG. 16 is a graph showing the range of vacuum pressure variations in inches of Hg verses flow rates of milk in gallons per minute for the above described Example 6.

The evaluation cluster study for Example 6 and as depicted in FIG. 16 shows that the vacuum line fluctuations are under about 2.75 inches of Hg, with the fluctuation range being in the order of about 2.1 inches of Hg at 1.00 gpm to 1.5 gpm flow rates.

EXAMPLE 7

This Example 1 has the following system specifications:
Milk Claw=⅞ inch
Hose inlet=⅞ inch ID
Sensor=⅞ inch ID located 24 inches from the milk line
Lift=0 inches
Line Milking Vacuum=13.50 inches of Hg
The tests results are as follows:

| Lift/<br>Inches | Milk Flow<br>Rate/<br>Gallons per<br>Minute | Maximum<br>Vacuum<br>Level/<br>Inches of Hg | Minimum Vacuum<br>Level/<br>Inches of Hg | Fluctuation<br>Range/<br>Inches of Hg |
|---|---|---|---|---|
| 0 | 0.50 | 13.56 | 13.31 | 0.25 |
| 0 | 1.00 | 13.62 | 13.29 | 0.33 |
| 0 | 1.50 | 13.63 | 13.06 | 0.57 |
| 0 | 2.00 | 13.94 | 12.66 | 1.28 |

Figure 17:
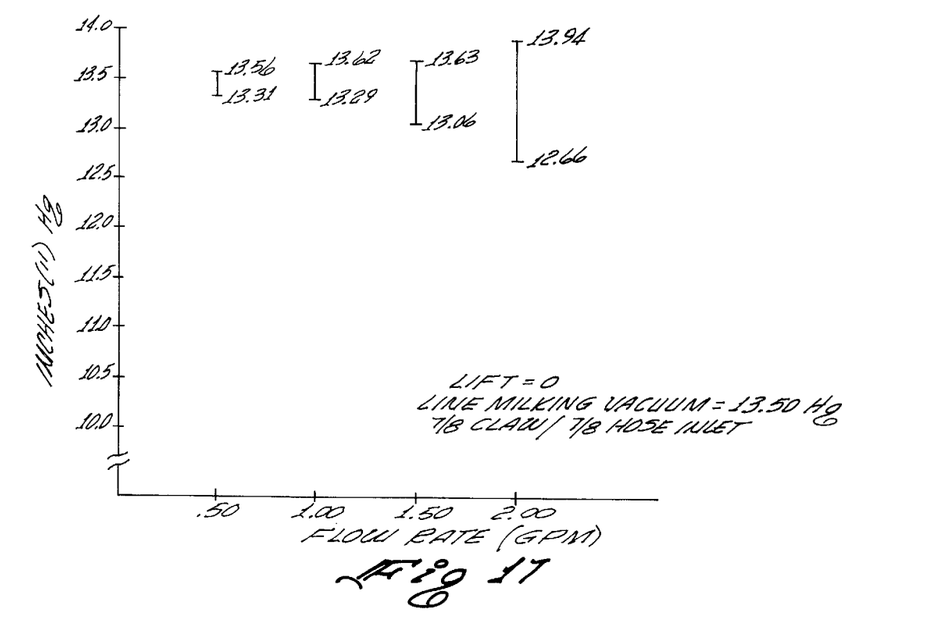
FIG. 17 is a graph showing ranges of vacuum pressure variations in inches of Hg verse flow rates of milk in gallons per minute for a ⅞ inch milk claw and ⅞ inch hose using the teaching of this invention at a lift of 0 inches and a line milking vacuum of 13.50 inches of Hg.

FIG. 17 is a graph showing the range of vacuum pressure variations in inches of Hg verses flow rates of milk in gallons per minute for the above described Example 7.

The evaluation cluster study for Example 7 and as depicted in FIG. 17 shows that the vacuum line fluctuations are under about 1.3 inches of Hg, with the fluctuation range being in the order of about 0.6 inches of Hg at 1.00 gpm to 1.5 gpm flow rates.

EXAMPLE 8

This Example 8 has the following system specifications:

Milk Claw=⅞ inch

Hose inlet=⅞ inch ID

Sensor=⅞ inch ID located 24 inches from the milk line

Lift=12 inches

Line Milking Vacuum=13.50 inches of Hg

The tests results are as follows:

| Lift/ Inches | Milk Flow Rate/ Gallons per Minute | Maximum Vacuum Level/ Inches of Hg | Minimum Vacuum Level/ Inches of Hg | Fluctuation Range/ Inches of Hg |
|---|---|---|---|---|
| 0 | 0.50 | 13.62 | 12.18 | 1.44 |
| 0 | 1.00 | 13.78 | 11.59 | 2.19 |
| 0 | 1.50 | 13.78 | 11.59 | 2.19 |
| 0 | 2.00 | 13.74 | 11.44 | 2.30 |

Figure 18:
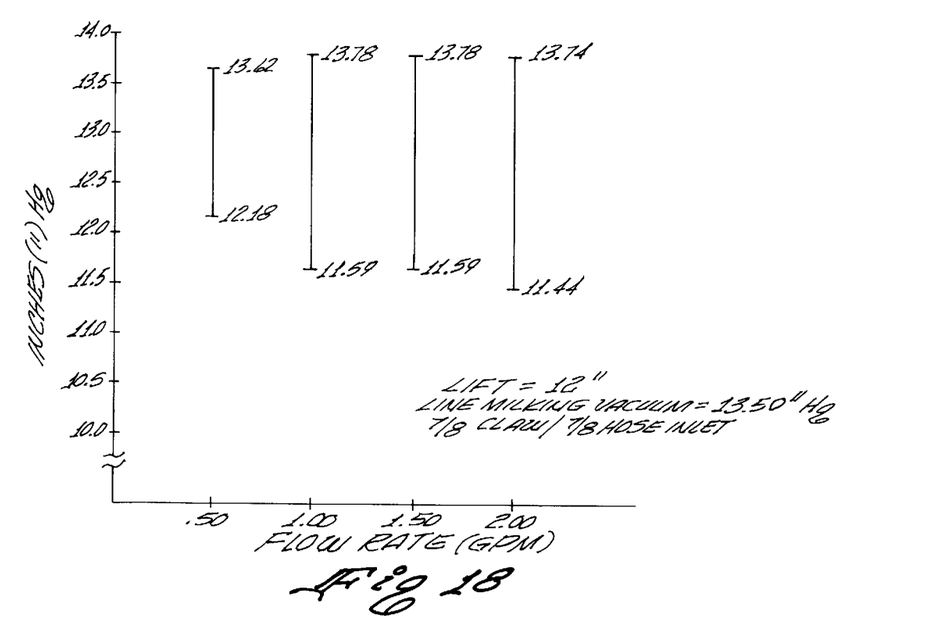
FIG. 18 is a graph showing ranges of vacuum pressure variations in inches of Hg verse flow rates of milk in gallons per minute for a ⅞ inch milk claw and ⅞ inch hose using the teaching of this invention at a lift of 12 inches and a line milking vacuum of 13.50 inches of Hg.

FIG. 18 is a graph showing the range of vacuum pressure variations in inches of Hg verses flow rates of milk in gallons per minute for the above described Example 8.

The evaluation cluster study for Example 8 and as depicted in FIG. 18 shows that the vacuum line fluctuations are under about 2.3 inches of Hg, with the fluctuation range being in the order of about 2.2 inches of Hg at 1.00 gpm to 1.5 gpm flow rates.

Thus, it is readily apparent that a reduction in the peak-to-peak excursions of the vacuum level due to flooding and a reduction in the change of the average vacuum level all reduce the vacuum level differential applied to the cow's udder 44. As such, the continued presence of a substantially stable continuous vacuum applied to the milk claw 60 and milk hose and the controlled vacuum applied to the teats 46 and substantially eliminates any possibility of reverse milk flow due to flooding.

During the testing of this invention use of a ¾ inch (0.750") ID as the predetermined cross-sectional area of the milk claw 60 outlet 64 and elimination of components with sharp curves resulted in maintaining a continuous vacuum channel and improved operating results as illustrated in FIG. 10.

Using a ⅞ inch (0.875") ID as the predetermined cross-sectional area of the outlet 64 yielded an even greater benefit from a stabilized vacuum aspect. However, using components having a 1.5 inch (1.5") ID, the milk system components start to become bulky and cumbersome and do not yield much additional benefit.

The preferred range of cross-sectional areas for the milk claw is about 0.625" to about 1.25" which is in the range of: (i) a minimum cross-sectional area for maintaining at all milk flow rates a substantially uniform laminar flow of milk therethrough and for concurrently providing a stable continuous vacuum in a vacuum channel between the laminar flow of milk and the interior walls of the outlet 64; and (ii) a maximum cross-sectional area equal to about 1.5 times the minimum cross-sectional area of the outlet 64.

It was also determined that using silicon material for the milk hose seemed to improve operating results.

The preferred commercial embodiment of the milking system consists of a full ⅞ inch (0.875") ID of all components including the milk claw outlet with a straight through (unrestricted) design from the milk claw to the milk line provided commercially acceptable operating results.

Testing showed the larger the preselected cross-sectional area used, in terms of ID for the milk claw, the better the system stability. However, manageability and workability, from the user's perspective, tended to suffer with use of components having larger IDs. Based on the testing to date and test results from users, preselected cross-sectional areas of between about ⅞ inch (0.875") to about 1 inch (1") using an outside wall thickness of ⅛ inch (0.125") or more appeared to be the most desirable cross-sectional areas within the minimum and maximum ranges of cross-sectional areas as describe herein before.

However, cross-sectional are on the order of about ⅝ (0.675 inches) were operable and still within acceptable ranges of vacuum fluctuations.

The preferred embodiment of the milking system disclosed herein using the teachings of the present invention is exemplary. It is understood that uses, variations, modifications and the like may be made and all such uses, variations, modifications and the like are anticipated to be within the scope of this invention.

What is claimed is:

1. A milk claw for a milking system comprising an outlet having side walls and a minimum internal diameter selected to be in the range of a minimum internal diameter of at least about 0.75 inches for maintaining at peak milk flow rates from a milking apparatus substantially uniform flow of milk therethrough and for concurrently providing a stable continuous vacuum in a vacuum channel between the flow of milk and the interior side walls of said outlet and a maximum internal diameter equal to about 1.5 times the minimum internal diameter.

2. A milk claw for use in a high production milking system to reduce milking time and fluctuations of vacuum levels in the milking system comprising an outlet having side walls and a predetermined minimum internal diameter selected to be in the range of a minimum internal diameter of at least about 0.75 inches for maintaining at peak milk flow rates from a plurality of inflations operatively connected to the milk claw substantially uniform flow of milk therethrough and for providing a stable continuous vacuum in a vacuum channel defined by the flow of milk and the interior side walls of said outlet and a maximum internal diameter equal to about 1.5 times the minimum internal diameter.

3. A milk claw adapted to be operatively connected to a milking apparatus withdrawing milk from an animal's teats while applying a controlled vacuum in the range of about 11.5 inches of HQ to about 14.0 inches of Hq to the teats enabling the milk to be withdrawn therefrom at various milk flow rates up to a peak flow rate, said milk claw comprising an outlet having side walls and a predetermined minimum internal diameter selected to be in the range of a minimum internal diameter of at least about 0.75 inches for maintaining at the various milk flow rates a substantially uniform flow of milk therethrough and for concurrently providing a stable continuous vacuum in a vacuum channel between the flow of milk and the interior side walls of said outlet and a maximum internal diameter equal to about 1.5 times the minimum internal diameter.

4. The milk claw of claim 3 further comprising a control orifice for controllably admitting atmospheric pressure to said milk claw for controlling the vacuum level within the milk claw outlet.

5. A milking system comprising a milking apparatus for connection with an animal's teats to apply a controlled vacuum to the teats to remove milk therefrom at various milk flow rates;

a milk claw operatively connected to the milking apparatus to receive and pass said milk under a continuous vacuum at a selected vacuum level, said milk claw including an outlet having side walls and a minimum internal diameter selected to be in the range of a minimum internal diameter of at least about 0.75 inches for maintaining at the various milk flow rates a substantially uniform flow of milk therethrough and for concurrently providing a stable continuous vacuum in a vacuum channel between the flow of milk and the interior side walls of said outlet and a maximum internal diameter equal to about 1.5 times the minimum internal diameter; and a milk transportation conduit operatively coupled to the outlet of said milk claw, said milk transportation conduit having a predetermined internal diameter substantially equal to the predetermined internal diameter of the outlet of said milk claw to transport milk from said milk conduit under a substantially stable, continuous vacuum.

6. The milking system of claim 5 wherein said milk claw further includes a control orifice for controllably admitting atmospheric pressure to said milk claw for controlling the vacuum level within the milk claw outlet.

7. The milking system of claim 6 wherein said control device is a milk flow measuring device adapted to terminate the vacuum at the end of a milking cycle.

8. The milking system of claim 5 further comprising a control device operatively connected to said milk transport conduit for passing and monitoring the flow of milk at all flow rates, said control device having internal diameter substantially equal to the predetermined internal diameter of said outlet.

9. A milking system having a substantially stable vacuum level for milking a cow comprising a milking apparatus for connection with a cow's udder having teats to apply a controlled vacuum to the teats to remove milk therefrom at various milk flow rates during lactation;

a milk claw operatively connected to the milking apparatus to receive and pass said milk under a continuous vacuum, said milk claw including an outlet having side walls and a predetermined internal diameter selected to be in the range of a minimum internal diameter of at least about 0.75 inches for maintaining at the various milk flow rates a substantially uniform flow of milk therethrough and for concurrently providing a stable continuous vacuum in a vacuum channel between the flow of milk and the interior side walls of said outlet and a maximum internal diameter equal to about 1.5 times the minimum internal diameter to maintain a substantially stable continuous vacuum within said milk claw; and a milk transportation conduit formed of a semi-rigid material operatively coupled to the outlet of said milk claw, said milk transportation conduit having interior side walls and a predetermined internal diameter substantially equal to the internal diameter of the outlet of said milk claw to transport said milk while maintaining a substantially uniform flow of milk and a substantially stable continuous vacuum within said in said milk transportation conduit while providing a continuous vacuum channel between the flow of milk and the interior side walls of said milk conduit.

10. The milking system of claim 9 further comprising a milk line operatively connect to said milk transportation conduit and having interior side walls and a predetermined internal diameter at least substantially equal to the internal diameter of the outlet of said milk claw to transport said milk while maintaining a substantially uniform flow of milk and a substantially stable continuous vacuum within said in said milk transportation conduit while providing a stable continuous vacuum in a vacuum channel between the flow of milk and the interior side walls of said milk line; and a milk receiver including a vacuum chamber operatively connected to said milk line to receive milk from said milk line under a substantially stable continuous vacuum.

11. The milking system of claim 10 wherein said milk claw further including a control orifice for controllably admitting atmospheric pressure to said milk claw for controlling the vacuum level within the milk claw outlet.

12. A method of milking an animal comprising receiving milk from an animal through a milk claw comprising an outlet having side walls and a predetermined internal diameter selected to be in the range of a minimum internal diameter of at least about 0.75 inches for maintaining at various milk flow rates up to a peak milk flow rate from a milking apparatus a substantially uniform flow of milk therethrough and for concurrently providing a stable continuous vacuum in a vacuum channel between the flow of milk and the interior side walls of said outlet and a maximum internal diameter equal to about 1.5 times the minimum internal diameter.

13. The method of claim 12 further comprising the stage of transporting milk received from said outlet through a milk transport conduit to a milk line wherein said milk transport conduit and said milk line each have a cross-sectional area substantially equal to said predetermined cross-sectional area of the outlet of said milk claw.

14. A system for milking a cow comprising a milking system comprising a milking apparatus for connection with a cow's udder having teats to apply a controlled vacuum in the range of about 11.5 inches of Hq to about 14.0 inches of Hg to the teats to remove milk therefrom at various milk flow rates up to a peak milk flow rate during a milking cycle;

a milk claw operatively connected to the milking apparatus to receive and pass said milk under a continuous vacuum, said milk claw including an outlet having side walls and a predetermined internal diameter selected to be in the range of a minimum internal diameter of at least about 0.75 inches for maintaining at the various milk flow rates a substantially uniform flow of milk therethrough and for concurrently providing a stable continuous vacuum in a vacuum channel between the flow of milk and the interior side walls of said outlet and a maximum internal diameter equal to about 1.5 times the minimum internal diameter to maintain a substantially stable, continuous vacuum within said milk claw;

a milk transportation conduit formed of a semi-rigid material operatively coupled to the outlet of said milk claw, said milk transportation conduit having interior side walls and a internal diameter substantially equal to the internal diameter of the outlet of said milk claw to transport said milk while maintaining a substantially uniform flow of milk and a substantially stable continuous vacuum within said in said milk transportation conduit while providing a continuous vacuum channel between the flow of milk and the interior side walls of said milk conduit;

a milk line operatively connected to said milk transportation conduit and having interior side walls and a internal diameter at least substantially equal to the predetermined internal diameter of the outlet of said milk claw to transport said milk while maintaining a substantially uniform flow of milk and a substantially stable continuous vacuum within said in said milk transportation conduit while providing a continuous vacuum channel between the flow of milk and the interior side walls of said milk line; and a source of vacuum operatively connected to said milk line and to a pulsator to apply vacuum thereto; and a flexible vacuum line operatively connected between said pulsator and said milking apparatus to enable the pulsator to controllably apply vacuum to inflations of said milking apparatus forming an "open" cycle where milking of the animal occurs and a "close" cycle wherein the animal rests and wherein a ratio of the "open" cycle to the "close" cycle has a predetermined ratio.

15. The system of claim 14 wherein said milk claw further includes a control orifice for controllably admitting atmospheric pressure to said milk claw for controlling the vacuum level within the milk claw outlet.

16. The system of claim 14 further comprising a milk receiver including a vacuum chamber operatively connected to said milk line to receive milk from said milk line under a substantially stable continuous vacuum.

17. The system of claim 14 further comprising a control device operatively connected to said milk transport conduit for passing and monitoring the flow of milk at all flow rates, said control device having internal diameter substantially equal to the predetermined internal diameter of said outlet.

* * * * *